A. FIELDS.
PORTABLE SPRAYING APPARATUS.
APPLICATION FILED NOV. 28, 1916.
1,242,930.
Patented Oct. 16, 1917.
2 SHEETS—SHEET 1.
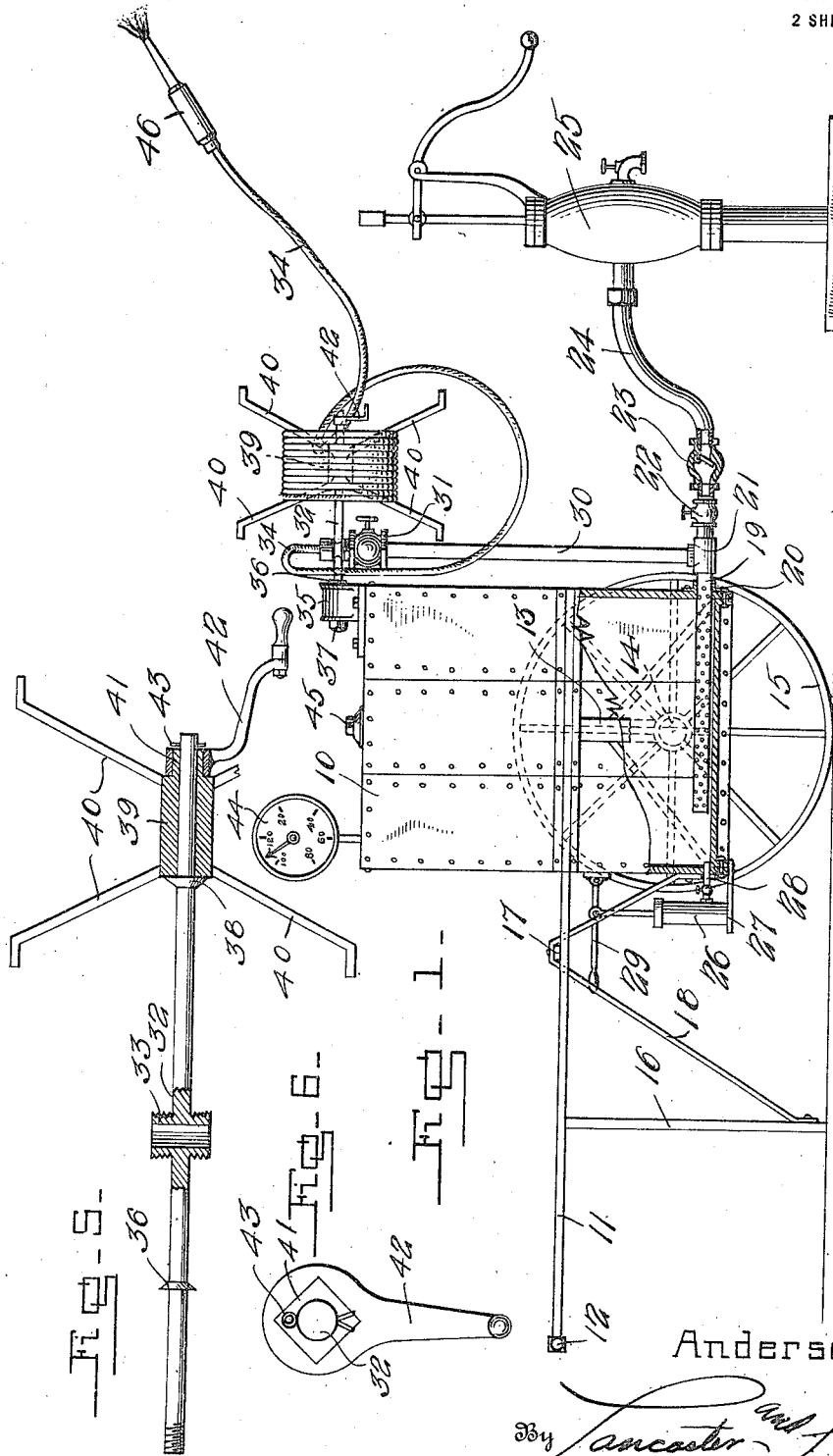
Inventor
Anderson Fields
His Attorneys

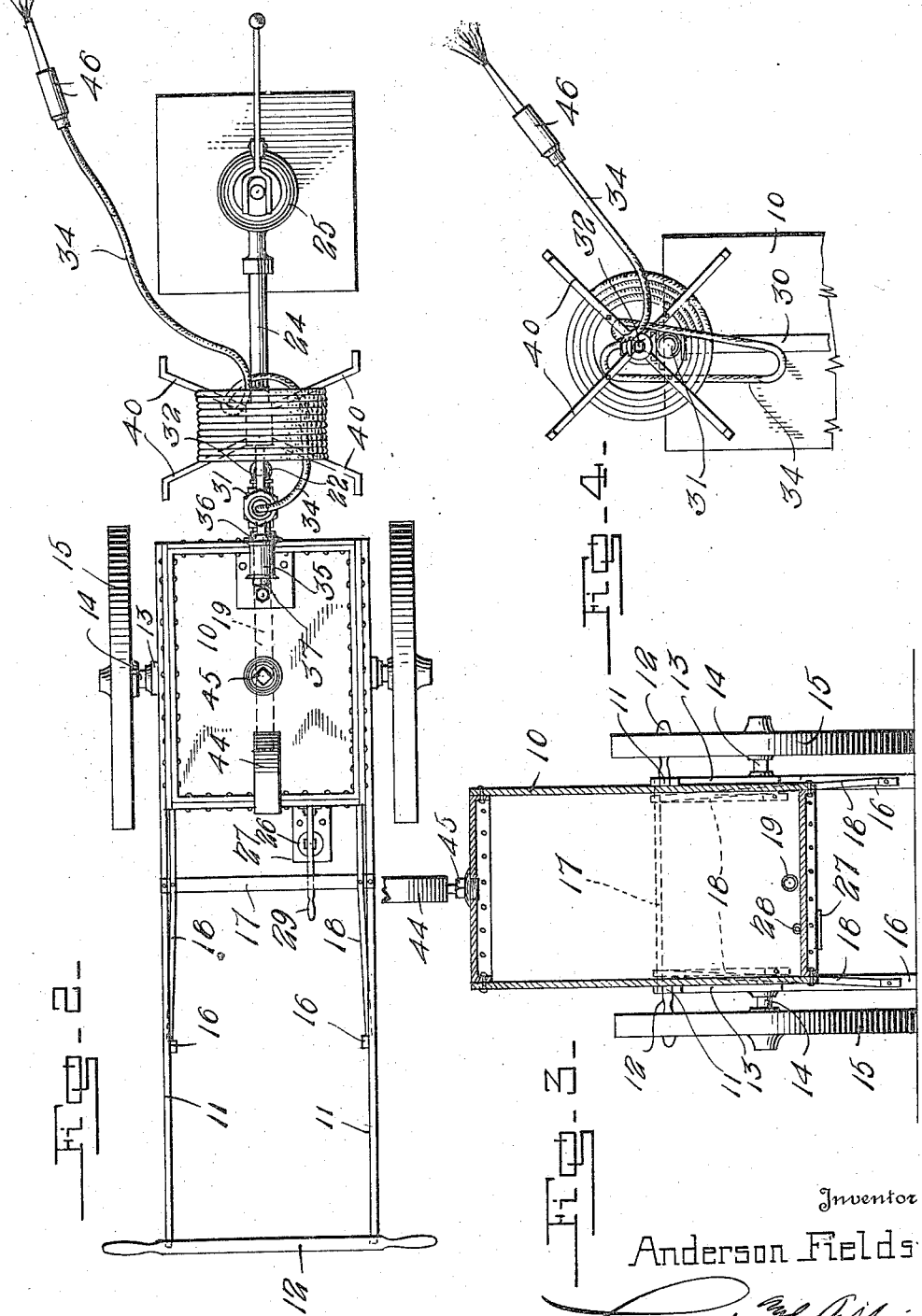

UNITED STATES PATENT OFFICE.

ANDERSON FIELDS, OF CASHION, OKLAHOMA.

PORTABLE SPRAYING APPARATUS.

1,242,930.  Specification of Letters Patent.  Patented Oct. 16, 1917.

Application filed November 28, 1916. Serial No. 133,921.

*To all whom it may concern:*

Be it known that I, ANDERSON FIELDS, a citizen of the United States, and a resident of Cashion, in the county of Kingfisher and State of Oklahoma, have invented a certain new and useful Improvement in a Portable Spraying Apparatus, of which the following is a specification.

The present invention relates to spraying apparatus, and has particular reference to a device of the portable type.

It is an object of the present invention to provide a device of this character which is of such construction that the parts thereof comprise a frame or vehicle which may be easily transported by hand from place to place, and which is adapted to force water under pressure through a hose or the like to be sprayed upon trees, flowers, garden lawns, and the like; for use in the case of fire; and which may be used for cleaning vehicles, and the like.

Another important feature of the present invention is to provide a structure of this character which is provided with an improved hose reel support, the same forming a connection between the pressure tank and the hose, and being peculiarly mounted upon the tank to support the reel in a convenient place and admit of quick and easy access to the hose.

It is the further aim of the present invention to provide an apparatus of this character which may be quickly and easily attached to a pump, or other convenient source of water supply, and which is provided with means for placing the water in the tank under pressure of air after the water has been placed in the tank.

Various other objects and advantages of this invention will be brought out in the following specific disclosure of the present preferred embodiment, the same being illustrated in the accompanying drawings wherein:

Figure 1 is a side elevation, partly in section, of a portable spraying apparatus constructed according to the present invention, and being disclosed as connected to a pump.

Fig. 2 is a top plan view of the same.

Fig. 3 is a transverse section taken centrally through the apparatus, looking toward the rear end thereof.

Fig. 4 is a detail fragmentary front elevation of the device, showing the mounting of the reel on the tank.

Fig. 5 is an enlarged detail sectional view of the supporting device for the reel, the view showing the water connection through the same.

Fig. 6 is an outer end view of the same.

Referring to these drawings, wherein like parts are designated by similar numerals of reference throughout the several views, 10 designates a tank or receptacle which is formed preferably of sheet metal, and is suitably reinforced to withstand considerable pressure. The tank 10 is preferably rectangular in form, and comprises the body part of the apparatus. Side bars 11 are secured to the opposite sides of the tank 10 adjacent to the lower end thereof, and project rearwardly for a considerable distance. A handle bar 12 is secured across the rear end of the bars 11 and is provided upon its opposite ends with laterally extending hand grips by means of which the bar may be grasped for the purpose of moving the apparatus from place to place. Bracket strips 13 are secured upon the opposite sides of the tank 10 and extend downwardly from the bars 11 a short distance. Outwardly extending spindles 14 are carried upon the lower ends of the bracket strips 13, and wheels 15 are suitably mounted on the spindles to support the tank and permit of the easy transportation of the same. The bars 11 are provided, intermediate their ends, with depending legs 16 adapted to support the bars and the tank substantially horizontally, and the bars 11 are reinforced by a cross-brace 17 located between the legs 16 and the tank 10.

For the purpose of further bracing the structure, a pair of straps 18 are employed. The straps 18 are secured at their rear ends to the lower ends of the legs 16, and are carried diagonally forwardly and are looped over the opposite ends of the transverse brace 17, the forward extremities of the straps 18 being secured to the lower end of the tank 10. The bracket strips 13 may be secured to the opposite sides of the tank 10 in any suitable location so as to distribute the weight of the apparatus substantially equally upon the opposite ends thereof.

The tank 10 is adapted to be partially filled with water, and for the purpose of introducing water into the tank a strainer tube 19 is projected into the lower end of the tank from the forward side thereof, and is secured rigidly in such position by means of a flanged plate 20 or the like which is secured against the forward side of the tank 10. A T-coupling 21 is secured upon the outer end of the strainer pipe 19, the branch of the T-pipe 21 extending upwardly. A hand-controlled valve 22 is connected to the outer end of the T-coupling 21, and in turn is connected to a check valve 23 which carries a section 24 of flexible piping or the like through which water is adapted to be introduced into the tank. In the present instance the flexible hose section 24 is shown as being detachably connected to a pump 25 by means of which water may be raised and forced into the tank 10 through the strainer tube 19. When the tank 10 is filled to the desired capacity, the hand valve 22 is closed and the hose section 24 is disconnected from the pump. As the strainer tube or pipe 19 is located in the bottom of the tank 10, it is necessary to provide the check valve 23 to prevent water from flowing backwardly from the tank 10 into the pump 25. By means of this check valve the valves in the pump are relieved of the strain of holding the water in the flexible pipe 24 and other connections which lead to the tank 10.

For placing the water in the tank 10, under pressure, an air pump 26 is mounted upon a platform 27 which is carried upon the rear end and the lower portion of the tank 10. The pump 26 is connected by a pipe 28 to the bottom of the tank 10, and the pump is operated by means of a handle 29 which projects rearwardly from the tank 10 in a convenient location to be grasped and operated. The pipe 28 is provided with a check valve in the usual manner, and is adapted to direct air under pressure from the pump 26 into the tank 10.

The shank of the T-coupling 21 is provided with a stand pipe 30 which extends upwardly at the forward end of the tank 10, and which terminates in a valve casing 31 in which is located a hand valve for controlling the flow of water upwardly through the stand pipe 30. The pipe 30 and the valve 31 are held in position at their upper ends by means of a supporting arm or spindle 32 which is provided intermediately with a coupling nipple 33 secured at one end to the valve 31 and adapted for attachment to one end of a hose 34 at its upper end. The inner end of the spindle or arm 32 is adapted for engagement with a bracket plate 35 which is secured upon the upper end of the tank 10, the arm 32 being provided with a collar 36 for engagement with the forward edge of the plate 35, and having a threaded rear extremity for the reception of a binding nut 37 for contact with the rear edge of the plate to hold the arm 32 from shifting longitudinally.

The outer end of the arm or spindle 32, beyond the nipple 33, is provided with a second collar 38 against which bears the inner end of a hub 39 of a hose-supporting reel. The hub 39 is provided in the usual manner with a plurality of radiating arms 40 upon and between which the hose is adapted to be coiled. The outer end of the hub 39 is preferably reduced, and is given angular formation to provide a shank 41 over which may be fitted a handle 42 for manually turning the reel. The spindle or arm 32 projects outwardly beyond the shank 41 of the hub, and may be provided upon its outer end with a cotter pin 43, or the like adapted to hold the handle 42 on the shank 41, and to hold the shank 42 and the hub upon the spindle 32. By the provision of this structure, the reel is supported not only by means of the bracket plate 35 which is carried on the tank 10, but also by means of the relatively strong stand pipe 30 which rises from the lower end of the tank. The spindle 32 is thus supported at its rear end, and also at an intermediate portion. The nipple 33 serves as a connection between the stand pipe and the spindle 32, and also as a water connection between the hose 34 and the stand pipe 30.

The tank 10 may be provided with a suitable gage 44 mounted on top thereof to indicate the pressure within the tank, the same being adapted to be raised to about one hundred and twenty pounds. The tank 10 may also be provided with a removable plug 45 in its upper end adapted to be removed for cleaning the tank and for relieving the same of pressure when desired.

In operation, it is only necessary to introduce a quantity of water through the hose section 24 and the strainer pipe 19 into the bottom of the tank. When the tank is filled to the desired extent, the valve 22 is closed. The pump 26 is now operated to place the water under pressure of air, and the apparatus is now ready for use. The hose 34 may be quickly removed from the reel and the nozzle 46 thereof directed and adjusted in the usual manner. The valve 31 is now opened and the water under pressure passes through the strainer pipe 19, the stand pipe 30 and upwardly througth the nipple 33 into the pipe 34. As the pump 26 is mounted on the tank 10 and forms a part of the apparatus, it is readily seen that the pressure may be renewed from time to time as the water is exhausted from the tank 10. The tank 10 may be filled nearly to the top with water, and the apparatus transported in such condition to the desired place for the distribution of the water. When the apparatus reaches the place of destination, the pump 26 may be then operated to place the water under pressure, and the pump continually operated to maintain an equal air pressure against the water in the tank as the water is ejected.

Another manner in which this improved spraying apparatus may be employed is by closing the outlet valve 31 and pumping a quantity of water into the tank 10 against the air which is already contained therein, and without operating the air pump 26. As soon as the desired amount of water is contained in the tank 10, and a suitable pressure is had, the nozzle 46 of the hose 34 may be opened and regulated to permit the water to escape at substantially the same rate at which the water is pumped into the tank.

This use of the device is contemplated when the hose 24 is connected to a windmill or the like which furnishes a substantially steady stream of water, and which forces the same into the tank 10 with considerable pressure. When a device is connected up in this manner one man may support and adjust the hose nozzle 46 to regulate the outflow of the water to retain the desired pressure of the water in the tank 10. In this manner a constant stream of water under the desired pressure may be delivered from the nozzle 46.

It is of course understood that various changes and modifications may be made in the above-specifically described construction of portable spraying apparatus without departing from the spirit of this invention, and being restricted only by the scope of the following claims.

I claim:—

1. In a spraying apparatus, the combination of a tank, an arm secured at one end to the tank and projecting beyond the same, a reel mounted to turn on the outer end of said arm, a hose adapted to be wound on said reel, an outlet pipe leading from the tank, said arm provided intermediate its ends with a hollow nipple adapted for securement at one end to said outlet pipe, and means for detachably engaging one end of said hose to the opposite end of said nipple whereby said arm is adapted to support said pipe and provide a connection therebetween and the hose, and to support said reel.

2. In an apparatus as specified, the combination of a tank adapted to contain water, an arm secured at one end to the tank and projecting beyond the same, said arm being provided intermediate its ends with a connecting nipple, a pipe leading from said tank adapted for securement at one end to said nipple, a reel mounted for rotation on the outer end of said arm, a hose adapted to be wound on said reel, and means for detachably connecting one end of said hose to the opposite end of said nipple.

3. In a portable spraying apparatus, the combination of a tank, wheels supporting the tank, side bars projecting rearwardly from the tank, legs carried by the side bars, braces mounted on the legs and the bars to interbrace the same, an inlet pipe connected to the lower end of the tank, a stand pipe rising from the inlet pipe at one side of the tank, valves arranged in said pipes to control the flow of water therethrough, an air pump connected to the tank adapted to place the water in the tank under pressure, a bracket arm mounted on the upper end of the tank and having connection with said stand pipe to support the same, a reel mounted on the outer end of said arm, and a hose adapted to be wound on said arm and having connection with the bracket arm to receive water therethrough from the stand pipe.

4. In a portable spraying apparatus, a tank, wheels mounted on the tank, a handle connected to the tank for moving the same, a strainer tube projecting into the lower end of the tank, a hose connection extending from the strainer tube and adapted for connection with a suitable source of water supply, a valve on the outer end of the strainer tube adapted to be closed when the tank is filled with water, a stand pipe rising from the strainer tube, a bracket arm carried upon the upper end of the tank and having an opening therethrough, a valve connecting the stand pipe to the arm in registry with the opening through the latter, a reel rotatably mounted on the outer end of said arm, a hose adapted to be wound on said reel, and means for connecting one end of the hose to said arm opposite said opening to receive water therethrough from the stand pipe.

5. In a spraying apparatus, the combination of a tank, a pipe leading from the tank, a bracket plate mounted on the upper end of the tank, an arm secured at one end in the bracket plate and projecting at its opposite end beyond the tank, said arm being provided intermediately with a hollow-attaching member adapted for securement at one end to the outer end of said pipe, a hose adapted to be secured at one end to the opposite end of said member, a reel mounted to turn upon the outer end of said arm and adapted to receive said hose thereon, and a handle detachably mounted on the outer end of said reel by means of which the reel is adapted to be turned.

ANDERSON FIELDS.